(12) United States Patent
Takehara et al.

(10) Patent No.: US 8,607,663 B2
(45) Date of Patent: Dec. 17, 2013

(54) SHIFT KNOB

(75) Inventors: Fumihiko Takehara, Isehara (JP);
Shoichi Yoshizawa, Tokyo (JP); Masato Inoue, Hakone-machi (JP); Daisuke Yamamoto, Zama (JP); Yuusuke Hoshimiya, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 4 days.

(21) Appl. No.: 13/386,083

(22) PCT Filed: Jul. 23, 2010

(86) PCT No.: PCT/JP2010/062429
§ 371 (c)(1),
(2), (4) Date: Jan. 20, 2012

(87) PCT Pub. No.: WO2011/010722
PCT Pub. Date: Jan. 27, 2011

(65) Prior Publication Data
US 2012/0260764 A1  Oct. 18, 2012

(30) Foreign Application Priority Data

Jul. 23, 2009 (JP) ................... 2009-172341
Jun. 2, 2010 (JP) ................... 2010-126398

(51) Int. Cl.
*G05G 1/10* (2006.01)

(52) U.S. Cl.
USPC .......................................... 74/543

(58) Field of Classification Search
USPC .......................................... 74/519, 523, 543
See application file for complete search history.

(56) References Cited

U.S. PATENT DOCUMENTS

| 4,532,824 A * | 8/1985 | Lamy et al. ............... 74/473.23 |
| 6,031,190 A | 2/2000 | Tokuda et al. |
| 6,038,937 A * | 3/2000 | Van Order et al. .......... 74/473.1 |
| 2011/0219901 A1 | 9/2011 | Giefer et al. |

FOREIGN PATENT DOCUMENTS

| EP | 1 229 272 A2 | 8/2002 |
| GB | 2 310 693 A | 9/1997 |
| JP | 11-78577 A | 3/1999 |
| JP | 2002-254944 A | 9/2002 |
| JP | 2007-210548 A | 8/2007 |
| JP | 2009-113584 A | 5/2009 |
| WO | WO 2009/018823 | 2/2009 |

* cited by examiner

*Primary Examiner* — Vicky Johnson
(74) *Attorney, Agent, or Firm* — Foley & Lardner LLP

(57) ABSTRACT

Disclosed is a shift knob (31) of a driving mode switching device allowing switching of multiple driving modes by rotation of a lever member (523) having a holding unit (31a) on an upper end thereof. In a region extending from a first position in a direction of an axis of the lever member (523) to a bottom surface (315) of the holding unit (31a) located downward of the first position, a length of the holding unit (31a) in a radial direction thereof is equal to or longer than a length thereof in the radial direction at the first position.

9 Claims, 10 Drawing Sheets

FR ←→ RR

FIG. 8
(a)
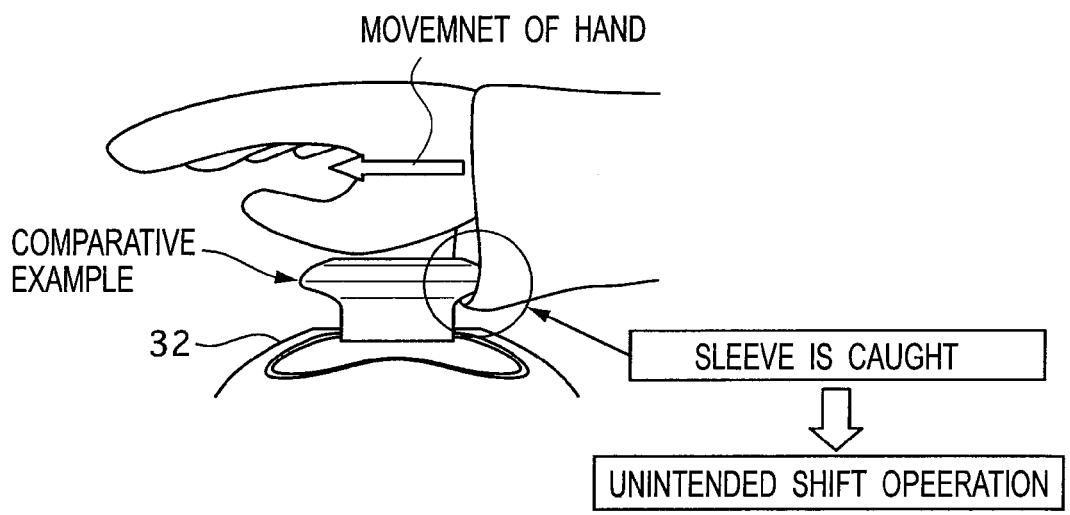
(b)
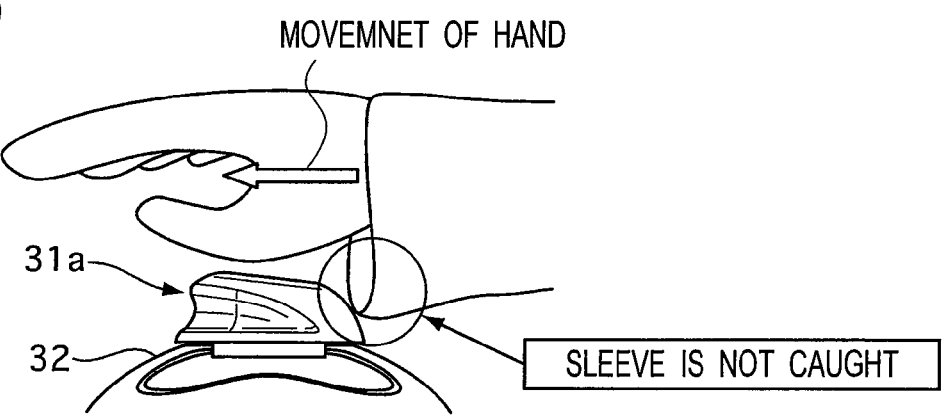

SHIFT KNOB

TECHNICAL FIELD

The present invention relates to a shift knob held by a driver for switching a driving mode of a vehicle by operation of the driver.

BACKGROUND ART

Japanese Patent Application Publication No. 2002-254944 discloses a device used to switch a driving mode by operation of a driver. In this device, a rod portion of a shift lever extends through a cross-shaped gate groove formed in a panel, and a shift knob is disposed on a distal end of the rod portion and serves as a member operated by the driver.

SUMMARY OF INVENTION

Technical Problem

There is a concern, however, in using the device described above, that a sleeve of cloth, an accessory or the like of the driver might be caught on the shift knob, then causing erroneous operation.

The present invention has been made with a focus on the problem described above and aims to provide a shift knob capable of avoiding erroneous operation.

Solution to Problem

An aspect of the present invention is a shift knob of a driving mode switching device, in which in a region extending from a first position in a direction of an axis of the lever member to a bottom surface of the holding unit located downward of the first position, a length of the holding unit in a radial direction thereof is equal to or longer than a length thereof in the radial direction at the first position.

BRIEF DESCRIPTION OF DRAWINGS

FIG. 8 is a schematic view showing a relationship between an area near the shift knob and a hand of the driver or the like.

DESCRIPTION OF EMBODIMENTS

<Embodiment 1>

Figure 1:
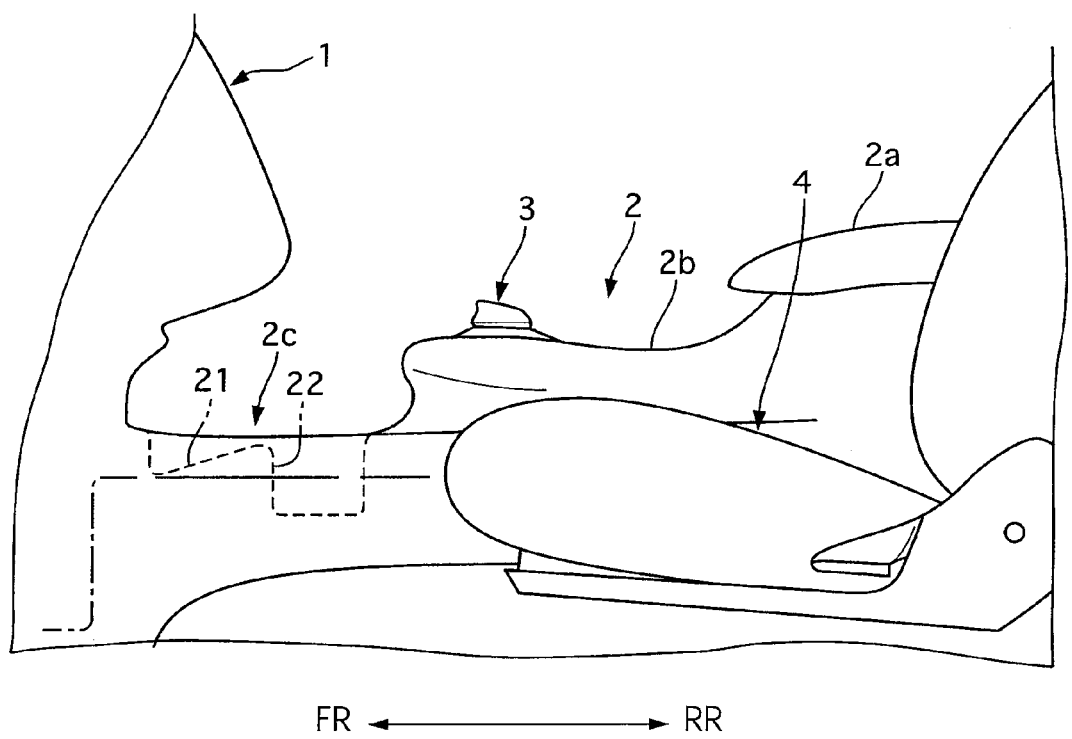
FIG. 1 is a partial side view showing vehicle interior of a vehicle according to Embodiment 1 of the present invention.
Figure 2:
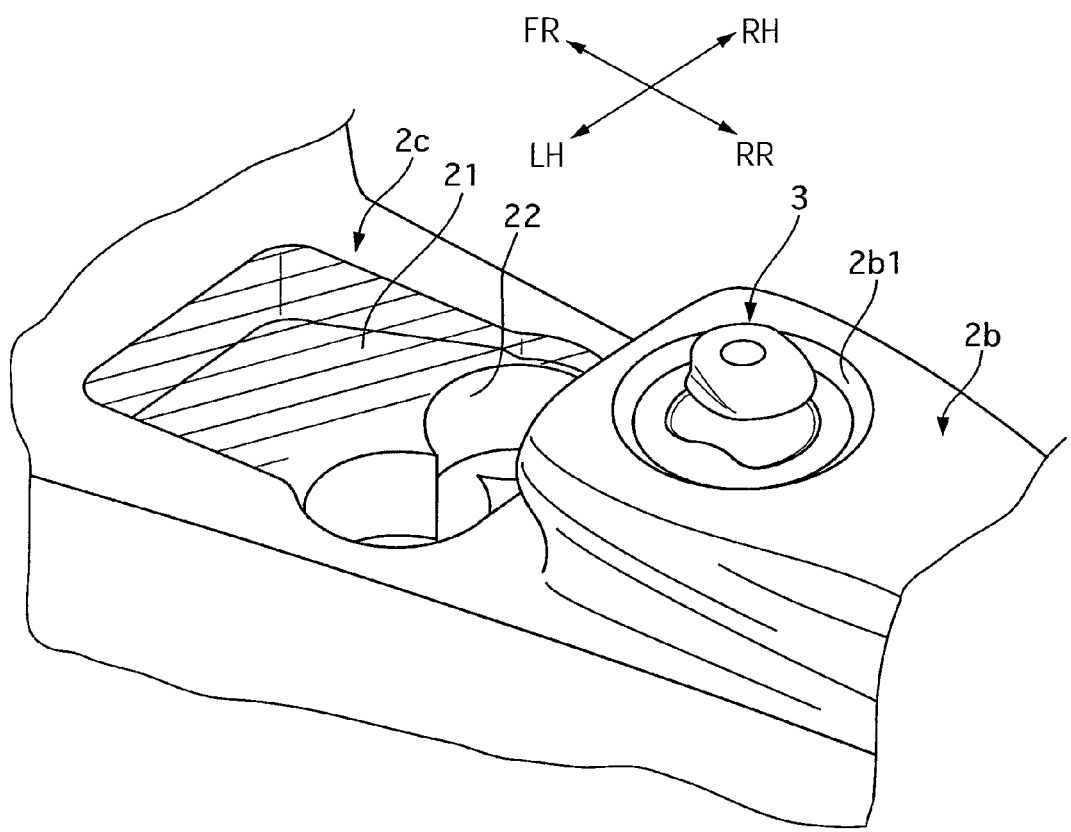
FIG. 2 is a perspective view showing a center console portion of the vehicle according to Embodiment 1.

Hereinafter, a description will be given of specific embodiments of the present invention in detail with reference to the drawings. FIG. 1 is a partial side view showing vehicle interior of a vehicle according to Embodiment 1 employing a shift knob of the present invention. FIG. 2 is a perspective view showing a center console portion of the vehicle according to Embodiment 1. A driving mode switching device according to Embodiment 1 functions as a switch to be disposed in a shift-by-wire system and is different from a select lever connected to an automatic transmission by a link mechanism or a wire. The driving mode switching device according to Embodiment 1 is mainly different from the latter select lever in that the driving mode switching device is not a system configured to physically move a manual valve or the like included in the automatic transmission, in that the driving mode switching device includes no detent mechanism used to produce an operational feeling by determining the range position, and the like. In addition, the driving mode switching device according to Embodiment 1 is operated for selection of a backward driving mode (corresponding to R-range), a forward driving mode (corresponding to D-range), and a neutral mode (corresponding to N-range). In general automatic transmissions, the position where the select lever is selected and stands still corresponds to the driving mode. However, in the driving mode switching device according to Embodiment 1, the initial position and the position after the mode is switched of a shift knob 31 to be described later always correspond to the home position. In general, a switch type in which the shift knob returns to the initial position regardless of the intention of the driver is called a momentary type, and in this description, a momentary type shift switch 3 is described as an example of the driving mode switching device. In addition, the vehicle according to Embodiment 1 is an electric automobile and includes no internal combustion system such as an engine. The vehicle is configured to achieve various driving modes by controlling a driving force of an electric motor. However, the vehicle to which the present invention is applied is not limited to an electric automobile and may be a vehicle including a general internal combustion system or a hybrid vehicle.

A center console 2 is disposed on a substantially center position in a vehicle width direction of an instrument panel 1, which extends in the vehicle width direction. The center console 2 is vertically provided between a driver seat 4 and a passenger seat on the outside of the drawing. The center console 2 includes: an armrest unit 2a, which is formed near a seat bag of the driver seat 4; an extension unit 2b, which extends forward from a front side end portion of the armrest unit 2a in a vehicle front-rear direction under a top surface of the armrest unit 2a, and which includes the momentary type shift switch 3 disposed near a front side end portion of the extension unit 2b in the vehicle front-rear direction; and a utility space 2c, which extends forward from the front side end portion of the extension unit 2b in the vehicle front-rear direction under a top surface of the extension unit 2b, and which includes a tray 21, a cup holder 22 and the like arranged on its top surface.

Figure 3:
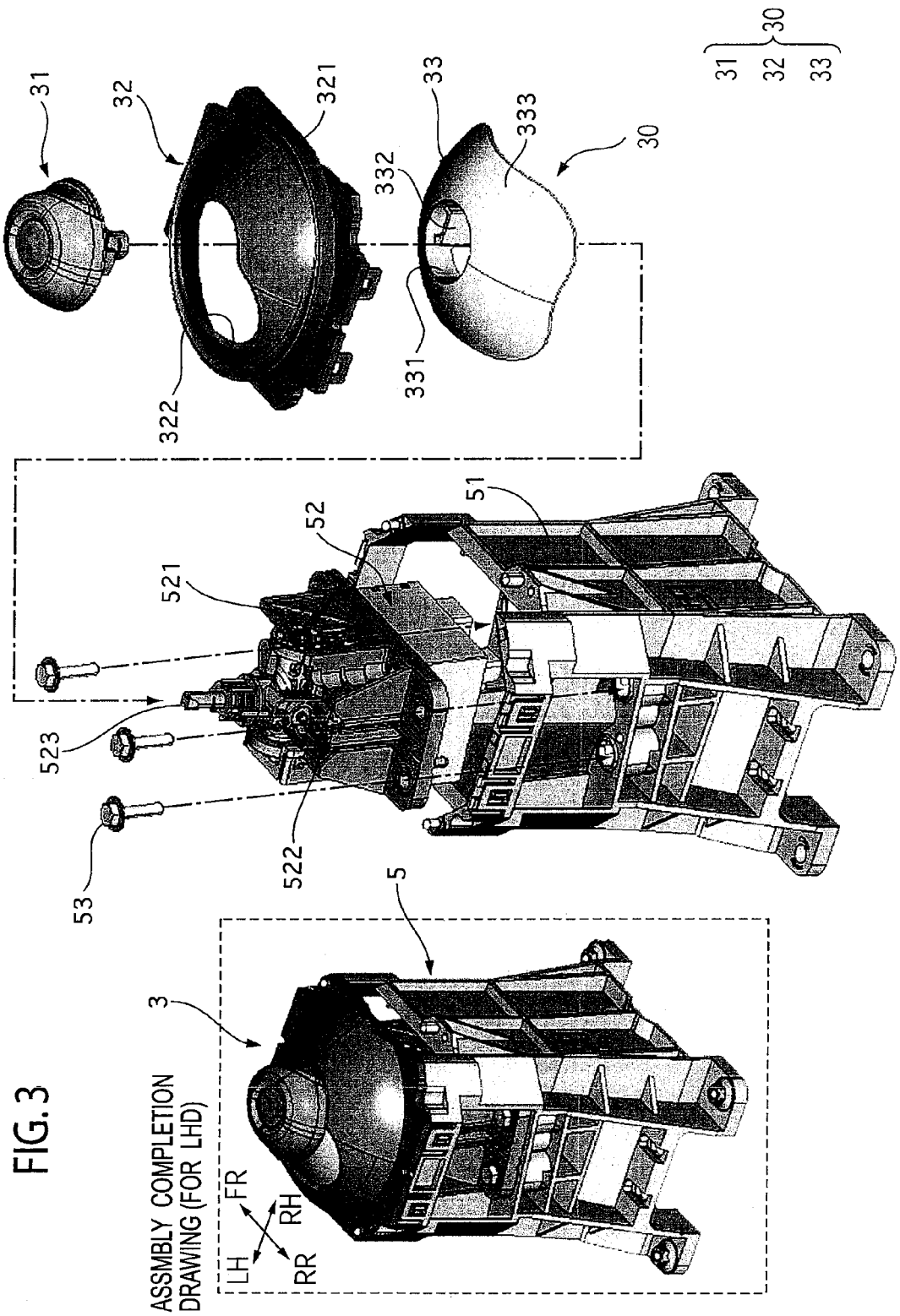
FIG. 3 is a perspective view showing a configuration of a momentary type shift switch according to Embodiment 1.

FIG. 3 is a perspective view showing a configuration of the momentary type shift switch 3 according to Embodiment 1. The momentary type shift switch 3 is fixedly supported by a shift base 5, which is mounted inside the center console 2. The shift base 5 includes: a base bracket 51, which is fixed to a floor panel of a vehicle body; and a shift assembly 52, which defines a shift operation direction of the driver and also sends an operated signal to the a control unit or the like. The shift assembly 52 is fixed to the base bracket 51 by fastening bolts 53. The shift assembly 52 includes: a first rotation shaft 521, which serves as a rotation center when the shift is operated in the vehicle front-rear direction; and a second rotation shaft 522, which is integrally formed with the first rotation shaft 521, and which rotates with the first rotation shaft 521 and also serves as a rotation center when the shift is operated in the vehicle width direction. A lever member 523, to which the shift knob 31 to be described later is attached, extends upwards from the second rotation shaft 522.

Figure 4:
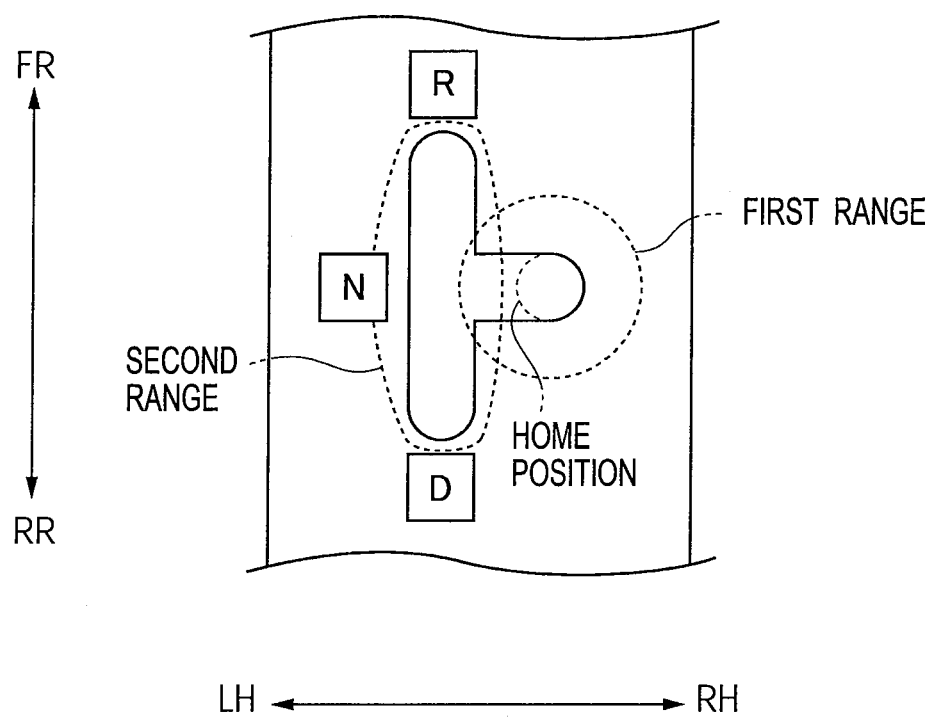
FIG. 4 is a schematic view showing an operation area of the momentary type shift switch according to Embodiment 1.

The first rotation shaft 521 and the second rotation shaft 522 are provided with an elastic force to keep them at a neutral position. While no external force is acting on the lever member 523, the first rotation shaft 521 and the second rotation shaft 522 are positioned upward (the lever member 523 stands in a substantially upright position) (the initial position: home position). FIG. 4 is a schematic view showing an operation area of the momentary type shift switch according to Embodiment 1. The momentary type shift switch 3 according to Embodiment 1 allows rotation of the shift knob 31 and the lever member 523 only to the left side in the vehicle width direction, i.e., to the driver seat side (first range) from the home position while prohibiting rotation of the same in the vehicle front-rear direction from the home position by the mechanical configuration thereof. In addition, the shift switch 3 is configured to allow rotation of the shift knob 31 and the lever member 523 in the vehicle front-rear direction (second range) after the shift knob 31 and the lever member 523 are pulled from the home position to the driver seat side and then rotated. Here, when the shift knob 31 and the lever member 523 are pulled to the driver seat side, and if a predetermined condition holds true (for example, when a predetermined time has passed or the like) in a state where the shift knob 31 and the lever member 523 stay at the position, it is determined that the neutral position is selected. Accordingly, when selecting the R-range or the D-range, even if the shift knob 31 and the lever member 523 pass through the neutral position multiple times, the predetermined condition does not hold true and it is not determined that the neutral position is selected. With this configuration, the operation in a substantially "T" shaped range is made possible.

A shift knob assembly 30 is attached on an upper portion of the shift assembly 52. The shift knob assembly 30 includes: the shift knob 31, which is an operation member to be operated while being held by the driver; a cover slide 33, which is integrally attached with the shift knob 31; and a finisher gate 32, which is placed between the shift knob 31 and the cover slide 33, and which is fixedly supported by the shift assembly 52. The cover slide 33 includes: a sliding spherical surface 333; a through hole 331, which is formed in a substantially center position of the sliding spherical surface 333, and through which a part of the shift knob 31 is inserted; and a fit portion 332, which is used to integrally build the shift knob 31 and the cover slide 33. The finisher gate 32 includes: a finisher spherical surface 321; and a gate 322, which opens only in the operation range of the shift knob 31. The finisher gate 32 and the cover slide 33 are formed so as to be relatively movable. The sliding spherical surface 333 is formed in a range capable of always shielding the shift assembly 52 side from the vehicle interior side even when the shift knob 31 is operated and the position of the shift knob 31 is thus changed within the gate 322.

Figure 5:
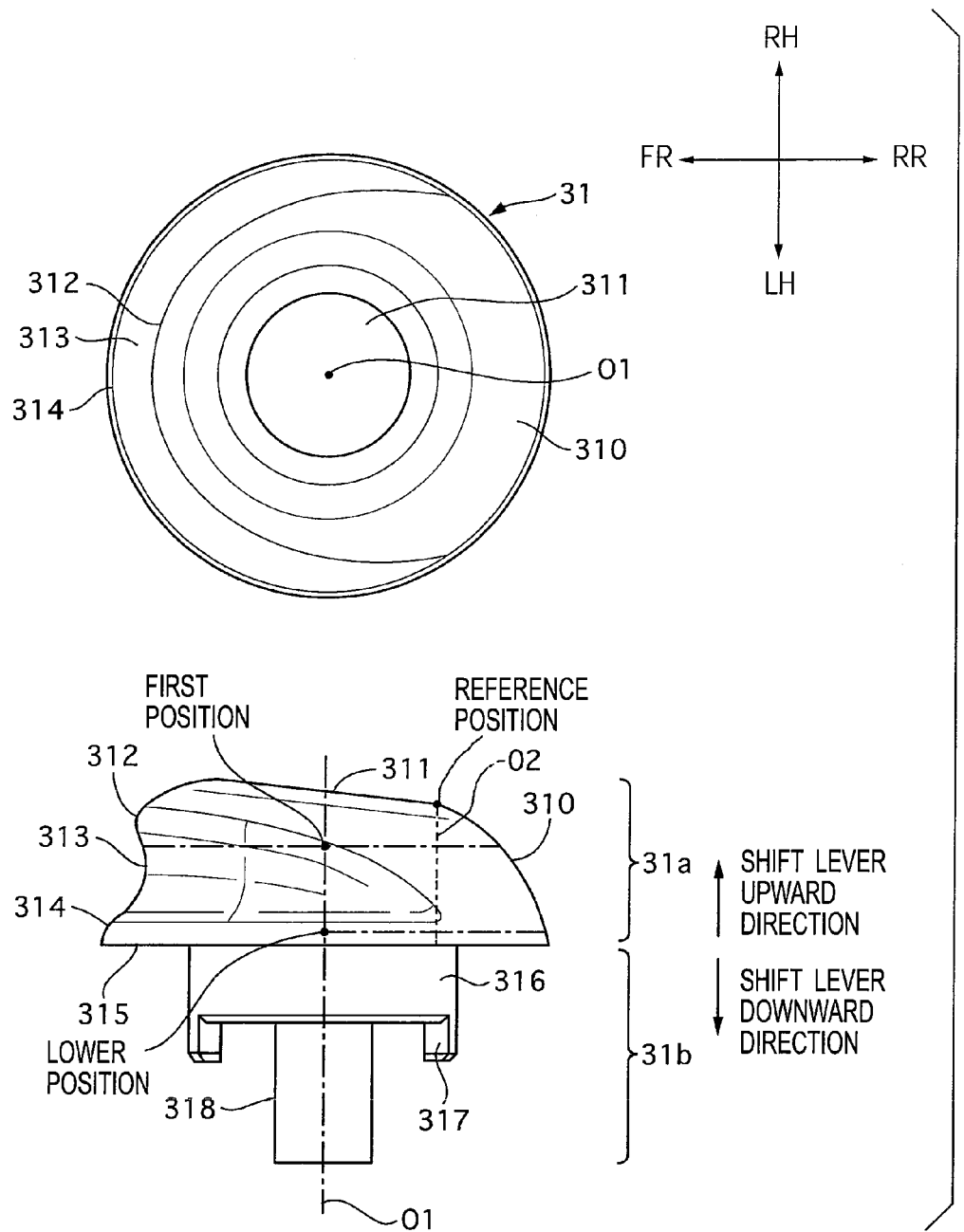
FIG. 5 shows a top view and a side view of a shift knob according to Embodiment 1.

FIG. 5 shows a top view and a side view of the shift knob 31 according to Embodiment 1. The shift knob 31 includes: a holding unit 31*a*, which is accessible by a hand or the like of the driver; and a lever unit 31*b*, which is not to be touched by the hand or the like of the driver. In this description, whether or not a certain portion serves as the holding unit is determined depending on whether or not the hand of the driver touches the certain portion during a normal operation of the shift knob 31. Accordingly, even if the entire shift knob is constituted of a single member, which portion of the shift knob serves as the holding unit is determined on the basis of the shapes of portions of the shift knob and functions based on the shapes. There are cases, for example, where a surface having a largest cross sectional area perpendicular to the axis in the shift knob is defined as the bottom surface (lowermost surface or lowermost end) of the holding unit, and where, when a constriction is provided in a tubular shift knob having a substantially constant cross sectional area, the lower end position of the constriction is defined as the bottom surface (lowermost surface or lowermost end) of the holding unit. The holding unit 31*a* has outermost circumference formed in a circular shape in a top view and is designed to have a size within a range (a diameter of approximately 10 cm, for example) slightly smaller than a palm of a general adult person. An axis O1 of the shift knob 31 coincides with an axial direction of the lever member 523 to which the shift knob 31 is attached. Here, the direction in which the lever member 523 extends (the axial direction of the lever member 523: the direction of the axis O1) is termed as a shift lever direction, while an upward direction along the axis O1 is termed as a shift lever upward direction (upward direction of the axis O1) and a downward direction along the axis O1 is termed as a shift lever downward direction (downward direction of the axis O1).

A first curved surface 310, which is a smooth curved surface, is formed on a rear side of the holding unit 31*a* (rear side in the vehicle front-rear direction). The first curved surface 310 is formed in such a manner as to radially expand from the shift lever upward direction to a downward direction, i.e., the distance in the radial direction from the axis O1 increases at a lower position in the direction of the shift lever. To put it differently, the first curved surface 310 is formed as a curved surface whose normal vector always has a component upward in the shift lever direction. To put it differently again, the length of the first curved surface 310 in the radial direction at a first position in the direction of the axis O1 is shorter than a length thereof in the radial direction at a position lower than the first position in the direction of the axis O1. The length of the curved surface in the radial direction refers to a distance between the curved surface and the axis O1 on a plane perpendicular to the axis O1 passing through the position in the axial direction. To put it more specifically, the length in the radial direction at the first position in the direction of the axis O1 described above is the distance between the first curved surface 310 and the axis O1 on a plane perpendicular to the axis O1 passing through the first position. Meanwhile, the above-described length in the radial direction at a position lower than the first position in the direction of the axis O1 is the distance between the first curved surface 310 and the axis O1 on a plane perpendicular to the axis O1 passing through the position.

In the holding unit 31*a*, an outer shape (outline) on a cross section including the axis O1 (i.e., in a side view) has a curved line (the line of intersection between a side surface on the rear side of the holding unit 31*a* and a plane including the axis O1 presents a curved line). In other words, the holding unit 31*a* is formed in such a way that the length in the radial direction on a rear side of the holding unit 31*a*, in particular, on a rear side from the axial center (axis O1) is equal to or longer than the length in the radial direction at the first position in a region extending from the first position in the axial direction of the lever member 523 to a bottom surface 315 (lowermost surface or lowermost end) of the holding unit 31a. The length in the radial direction of the holding unit refers to a distance between the outer shape line of the holding unit and the axis O1 on a plane perpendicular to the axis O1 passing through the position in the axial direction (thickness of the holding unit in the radial direction). To put it more specifically, the rear side of the holding unit 31a is formed in such a way that a distance between the outer shape line of the holding unit 31a and the axis O1 on a plane perpendicular to the axis O1 is equal to or greater than the distance between the outer shape line of the holding unit 31a and the axis O1 on a plane perpendicular to the axis O1 passing through the first position in a range in the axial direction from the first position in the direction of the axis O1 to the position of the bottom surface 315 of the holding unit 31a. FIG. 5 shows an example in which the first position is set slightly above the center position of the holding unit 31a in the axial direction. However, even if the first position is set at any position in the axial direction, the length of the holding unit 31a in the radial direction increases towards the bottom surface 315 (lowermost surface or lowermost end) from the set position.

To put it simply, focusing on the outer shape on the cross section including the axis O1, there is a relationship where, even if the first position is set at any position, the length of the holding unit 31a in the radial direction at a position lower than the first position in the direction of the axis O1 increases towards the bottom surface 315 (the lowermost surface or lowermost end of the holding unit 31a). In Embodiment 1, the characteristics of the increase in the length in the radial direction are changed at a predetermined position in the axial direction in the following manner. On a top surface portion 311 to be described later, the length in the radial direction increases in proportion to distance in the downward direction of the axis (on a cross section including the axis O1, the length of a perpendicular line drawn to the axis O1 from a point on the outer shape line of the top surface portion 311 increases in proportion to a distance in the direction of the axis O1 between the point on the outer shape line and an intersection point between the outer shape line and the axis O1). On the first curved surface 310, the length in the radial direction increases so as to draw a curved line convex in the upward direction of the axis (on a cross section including the axis O1, the length of a perpendicular line drawn to the axis O1 from a point on the outer shape line of the first curved surface 310 is larger at a lower position in the direction of the axis O1, but the increasing rate of the length is smaller at a lower position in the downward direction of the axis O1). However, the length in the radial direction may be proportionally increased towards the lowermost surface of the holding unit 31a without changing the characteristics of the increase, or may be increased so as to draw a curved line convex in the upward direction of the axis always. This configuration prevents a sleeve or an accessory or the like of the driver or the like from being caught on the holding unit 31a. Furthermore, the outer shape line of the holding unit 31a on a cross section including the axis O1 is a straight line that increases proportionally or an upward convex curved line as described above, and its normal vector has a component upward in the direction of the axis O1. Thus, even if a sleeve or the like comes in contact with the holding unit 31a, the sleeve or the like can be moved (guided) in the upward direction of the axis. Thus, a sleeve or the like can be prevented from being caught on the holding unit 31a. Note that, the top surface portion 311 and the first curved surface 310 may also include a configuration in which the length in the radial direction increases so as to draw a curved line convex in the downward direction.

The holding unit 31a has the top surface portion 311 on the upper side of the shift lever. The top surface portion 311 is a relatively flat, circular inclined surface that is inclined in such a way that the surface on the front side in the vehicle front-rear direction is positioned higher than the surface on the rear side in the vehicle front-rear direction. In other words, the normal vector of the top surface portion 311 has a component rearward in the vehicle front-rear direction. The top surface portion 311 thus receives in a wide range, a force applied forward in the vehicle front-rear direction from the palm of the driver.

Here, a joint portion between the top surface portion 311 and the first curved surface 310 or a boundary therebetween is defined as a reference point. To put it specifically, the position where the inclination (curvature) changes from the top surface portion 311, which is substantially linear in a side view (or the point where the inclination (curvature) of the outer shape line on a cross section including the axis in the vehicle front-rear direction and the axis O1 changes) is defined as the reference point as shown in the side view of FIG. 5. Then, the axis passing through this reference point along the shift lever direction (axis in parallel to the axis O1) is defined as an axis O2, while the direction approaching the axis O1 from the axis O2 is defined as an inner side, and the direction away from the axis O1 further than the axis O2 is defined as an outer side. Here, the first curved surface 310 is formed in such a way not only that its surface radially expands in the downward direction of the shift lever, and the distance in the radial direction from the axis O1 increases but also that the first curved surface 310 has an expansion portion on the outer side of the axis O2 passing through the reference point, the expansion portion expanding in a direction toward the bottom surface 315, which is the lowermost end in the axial direction from the reference point. In other words, for forming the thickness in the axial direction to the downward direction from the relatively flat top surface, the shift knob 31 has the first curved surface 310 as an expansion portion in which the length in the radial direction from the axis O2 increases towards the lowermost end of the holding unit 31a from the reference point, and the normal vector of the first curved surface 310 has a component upward in the direction of the axis O2. Accordingly, even if a sleeve or the like comes in contact with the first curved surface 310, the sleeve or the like can be moved (guided) to the upper side. Thus, a sleeve or the like can be prevented from being caught on the first curved surface 310. Here, the length in the radial direction from the axis O2 of the holding unit refers to a distance between the outer shape line of the holding unit and the axis O2 on a plane perpendicular to the axis O2. Note that, since the reference point is defined as a boundary between two surfaces largely different in curvatures, (the top surface portion 311 and the first curved surface 310 in Embodiment 1), the top surface portion 311 does not have to be flat and may be a dome shape or the like having a slight curvature. In addition, the aforementioned curvatures may be determined on the basis of a rough silhouette even if the outer shape line has some irregularities or the like.

Moreover, the holding unit 31a includes a bulging portion 312, a curvature surface 313 and a radially-expanding portion 314 in a region of the holding unit 31a from the lateral sides to the front side (the left side, the right side, and the lateral surfaces on the front side) thereof. The bulging portion 312 bulges outward in the radial direction in such a way that the outer circumference (the length of the outer circumference on a cross section perpendicular to the axis O1) is larger than an outer circumference at a predetermined position lower than the top surface portion 311 in the shift lever direction (downward direction of the axis O1) but smaller than the largest outer circumference of the holding unit 31a. The curvature surface 313 curves inward in the radial direction at a position lower than the bulging portion 312 in the shift lever direction. The radially-expanding portion 314 radially expands at a position lower than the curvature surface 313 in the shift lever downward direction, i.e., is formed in such a way that the distance in the radial direction from the axis O1 increases as extending downward in the direction of the axis. The radially-expanding portion 314 forms the largest outer circumference of the holding unit 31a. The curvature surface 313 is formed in such a way that its curved surface is the longest in the shift lever direction on the lateral surfaces on the front side of the holding unit 31a in the vehicle front-rear direction, i.e., in such a way that the width of the curvature surface 313 in the direction of the axis O1 is largest over the left and right lateral surfaces from the lateral surfaces on the front side in the vehicle front-rear direction and become smaller as the surface extends to the rear side in the vehicle front-rear direction. To put it more specifically, the curvature surface 313 is formed in such a way that the width of the curvature surface 313 in the direction of the axis O1 gradually reduces. In addition, the radially-expanding portion 314 is continuously connected to the first curved surface 310 and forms the largest outer circumference of a disk shape at the lowermost end of the holding unit 31a.

The bulging portion 312, the curvature surface 313 and the radially-expanding portion 314 described above form a finger hook portion on the outer shape of the holding unit 31a, where fingers of a hand of the driver are easily hooked, thereby improving the operability. The bottom surface 315 is formed between the holding unit 31a and the lever unit 31b. In the case of Embodiment 1, the bottom surface 315 is formed in such a way that a cross section perpendicular to the axis O1 of the bottom surface 315 has a cross sectional area larger than cross sections at any other positions in the direction of the axis O1, i.e., has the largest cross sectional area. In addition, the longest diagonal line, i.e., the diameter passing through the axis O1 of the bottom surface 315, which has the largest cross sectional area of the holding unit 31a, is formed so as to be larger than the largest value of the length of the holding unit 31a in the direction of the shift lever. To put it differently, the holding unit 31a is formed in such a way that the largest value of the width in a direction perpendicular to the axis O1 is larger than the value of the longest length in the direction of the axis O1. Since the holding unit 31a is formed in a low-profiled shape as described above, the holding unit 31a can receive the palm of the driver entirely, thereby bringing about a so called palmrest effect. The driver can wait while putting his or her arm on the armrest unit 2a and putting his or her palm on the holding unit 31a. In addition, since the holding unit 31a is formed in a low-profiled shape, the space occupied by the shift lever in the vehicle interior space can be reduced. Thus, the vehicle interior space can be effectively used.

The lever unit 31b includes a first lever member 316, which has a diameter substantially identical to the diameter of the through hole 331 of the cover slide 33. The first lever member 316 has claw portions 317, which are fitted into the fit portion 332 of the cover slide 33. The claw portions 317 are fitted into the fit portion 332 of the cover slide 33 in a state where the finisher gate 32 is placed between the first lever member 316 and the cover slide 33. The first lever member 316 is attached while protruding from the sliding spherical surface 333 of the cover slide 33 in the radial direction of the spherical surface by a predetermined length. The lever unit 31b has a second lever member 318, which is smaller than the first lever member 316 in diameter and is fitted to a shaft of the lever member 523.

Figure 6:
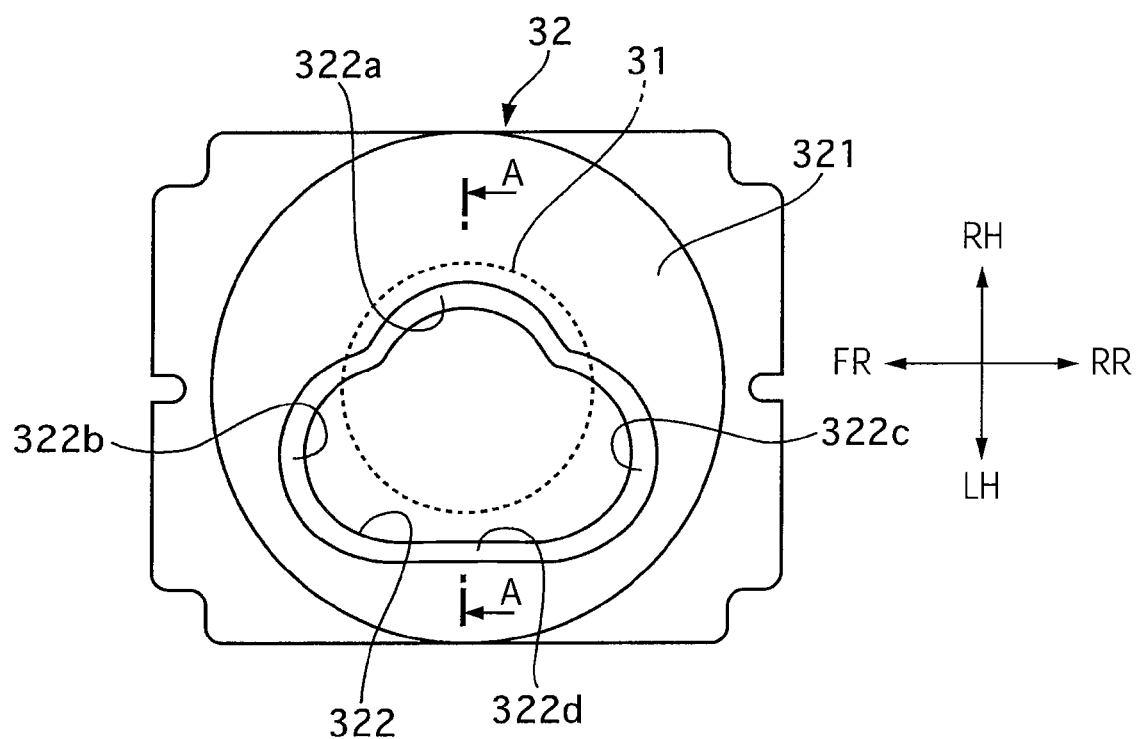
FIG. 6 shows a top view of a finisher gate according to Embodiment 1.

FIG. 6 shows a top view of the finisher gate 32. The finisher gate 32 is disposed in such a way that only the finisher spherical surface 321 is exposed through a circular opening 2b1 formed on the extension unit 2b of the center console 2. The gate 322 is opened on the finisher spherical surface 321. This gate 322 includes: a reverse gate 322b, which forms the R-range position for selecting the backward driving mode; a drive gate 322c, which forms the D-range position for selecting the forward driving mode; and a neutral gate 322d, which is in the intermediate position between the reverse gate 322b and the drive gate 322c, and which forms the neutral range position. In addition, the gate 322 includes a home gate 322a, which forms the home position, on the right side of the neutral gate 322d in the vehicle width direction, i.e., on the passenger seat side. To put it in another way, the finisher gate 32 is a member formed in a curved surface shape that has a cutout in a region where the shift knob 31 moves and that covers a region other than this range. Here, the cutout represents the gates 322, and the first range described above corresponds to a range of the cutout formed from the home gate 322a to the neutral gate 322d and the second range corresponds to a range of the cutout formed from the neutral gate 322d to the reverse gate 322b and the drive gate 322c. As shown in a dotted line in FIG. 6, when the shift knob 31 is at the home position, an edge portion of the home gate 322a is completely covered by the shift knob 31 and thus is not exposed.

Figure 7:
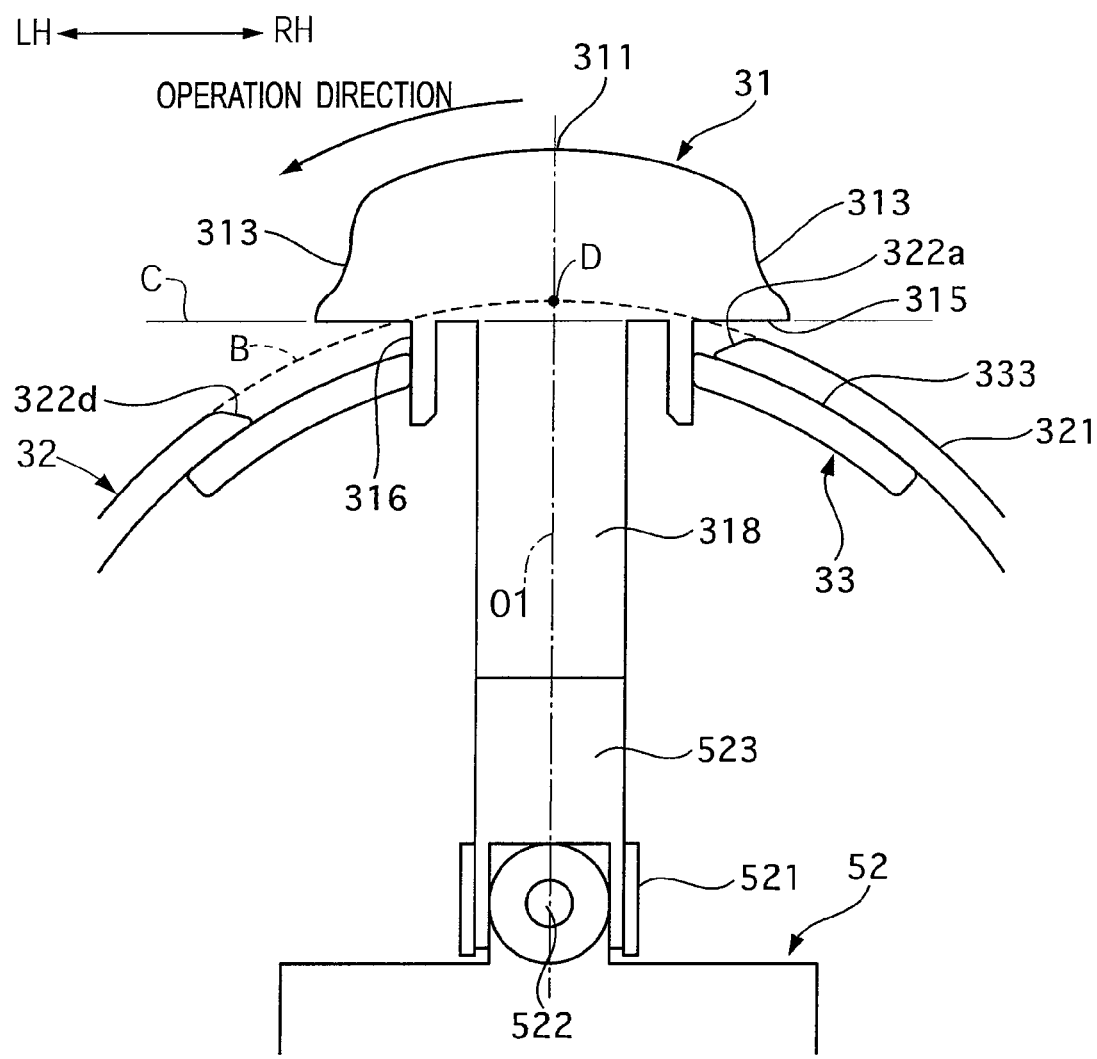
FIG. 7 is a schematic view showing a partial cross-sectional view taken along the line A-A in FIG. 6 according to Embodiment 1.

FIG. 7 is a schematic view showing a partial cross-sectional view taken along the line A-A in FIG. 6. An auxiliary line B on the gate portion of the finisher gate 32 (dotted line in FIG. 7: a line formed by virtually extending the outer shape line of the top surface of the finisher spherical surface 321 over the opening portion of the gate 322) is arranged so as to be positioned above an auxiliary line C (virtual line showing a plane formed by virtually extending the bottom surface 315) of the bottom surface 315 of the holding unit 31a in the shift lever upward direction in a side view (in such a way that an intersection point D between the auxiliary line B on the gate portion and the axis O1 is located outward in the radial direction of the finisher spherical surface 321 from the auxiliary line C). To put it differently, the auxiliary line B on the gate portion and the auxiliary line C of the bottom surface 315 are arranged so as to have an intersection point as viewed in the direction of the rotation center of the shift knob 31. Thus, the holding unit 31a is placed extremely close to the finisher gate 32 and is placed in such a way that the lever portion is barely exposed. In addition, the finisher spherical surface 321 and the sliding spherical surface 333 of the cover slide 33 are each formed so as to have a constant curvature based on the first rotation shaft 521 and the second rotation shaft 522 as its rotation center. Thus, when the shift knob 31 is operated in any direction, the distance between the bottom surface 315 of the holding unit 31a and the finisher gate 32 is kept constant and the distance between the finisher gate 32 and the sliding spherical surface 333 is kept constant likewise. To put it in another way, the distance between the holding unit 31a and the finisher gate 32 and the distance between the finisher gate 32 and the cover slide 33 can be extremely short. This is because there is no interference caused by operation of the shift lever.

In addition, this means that the portion protruding from the finisher gate 32 in the shift lever upward direction can be set extremely short. To put it specifically, the lengths of the lever unit 31b and the lever member 523 can be set short, and the driving mode can be switched by a short shift stroke. With the type of a shift knob held by the palm so as to be covered by the entire palm as in Embodiment 1, the shift lever can be operated by the movement of a wrist Next, a description will be given of effects based on the aforementioned configuration. FIG. 8 is a schematic view showing a relationship between an area near the shift knob 31 and a hand of the driver or the like. FIG. 8(a) shows a holding unit according to a comparative example, and FIG. 8(b) shows the holding unit 31a according to Embodiment 1. The comparative example shows the holding unit formed with a shape in which the lever portion extends above the finisher gate and a portion above the lever portion is radially expanded. In the case of the comparative example, a sleeve of the driver or an accessory or the like worn on the arm is caught on the holding unit itself or easily caught by entering between the holding unit and finisher gate. In this case, there is a concern that unintended operation of the shift lever may be performed, which is not preferable. In particular, unlike a detent mechanism of an automatic transmission, a large reaction force against the operation force cannot be obtained in the case of the momentary type shift switch 3 as shown in Embodiment 1, so that the shift switch 3 is easily operated.

Note that, in a case where the finisher gate has the T shaped gate as in Embodiment 1, there is no problem with the movement in the front-rear direction from the home position because the operation of the shift lever is restricted in the first place. However, an oblique force is applied to the shift knob in many cases, actually. Thus, there is a concern that an erroneous operation is performed by a force of a component in the vehicle width direction in such cases. In addition, if the neutral position is set at a position where the shift lever is pulled to the driver side, there is a concern that the neutral position which is an unintended driving mode may be selected by erroneous operation performed in a state where the forward driving mode is selected, for example. In order to avoid such erroneous operation, it is conceivable to take a longer determination time to confirm that the neutral position is selected. However, if this determination time is longer, the driver has to continuously pull the shift lever for a long time when selecting the neutral position and thus feels a sense of discomfort.

Meanwhile, in the case of the holding unit 31a according to Embodiment 1, it is extremely unlikely that a sleeve or the like enters between the holding unit 31a and the finisher gate 32 because the gap therebetween is very small since the holding unit 31a and the finisher gate 32 are arranged extremely close to each other. In addition, as the shape of the holding unit 31a, the length of the first curved surface 310 in the radial direction at the first position of the axis O1 is shorter than the length thereof in the radial direction at a position lower than the first position. Moreover, the outer shape of the cross section (i.e., in a side view) including the axis O1 has a curved line. Furthermore, the normal vector of this curved line has a component upward in the direction of the axis O1. Thus, even if the sleeve or the like comes in contact with the holding unit 31a, the sleeve or the like can be moved forward along the first curved surface 310 without being caught on the holding unit 31a. Thus, unintended operation of the shift lever can be avoided. Furthermore, the shift switch 3 is configured to be operated after the shift knob 31 is pulled to the driver side first. Thus, although a relatively large clearance is formed between the lowermost surface of the holding unit 31a on the driver side and the cover slide 33, the shift switch 3 is configured not to allow movement of the shift knob 31 to the passenger side. Thus, even if the sleeve or the like is caught in the clearance, there is no problem in particular.

Figure 9:
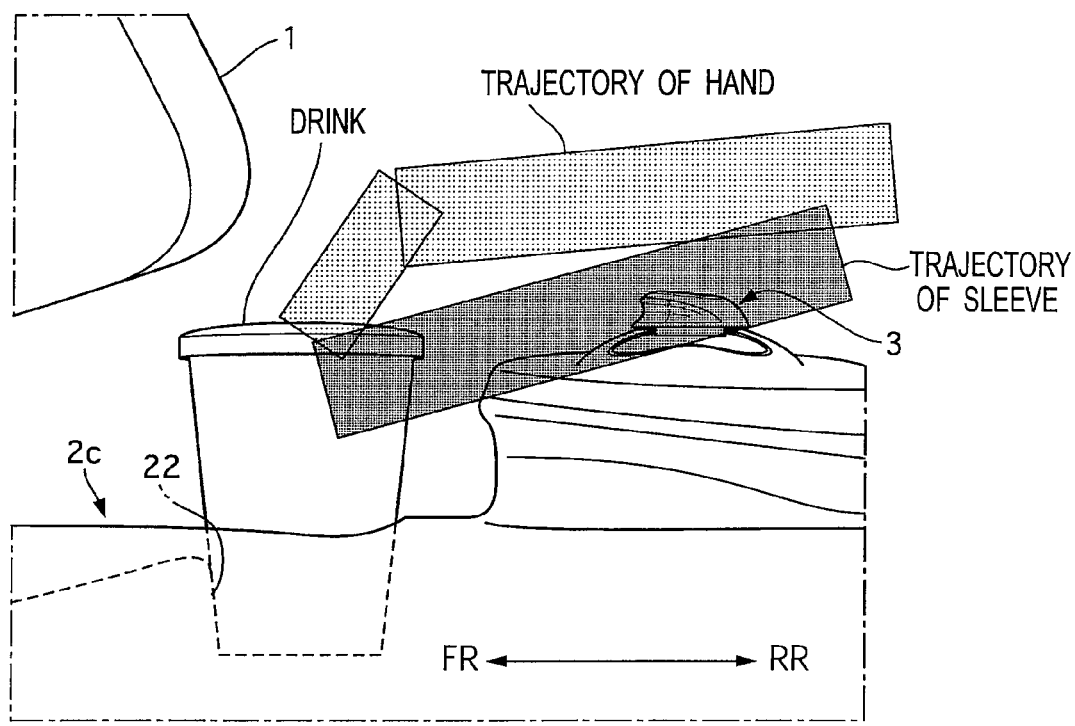
FIG. 9 is a diagram showing a trajectory of a hand and a trajectory of a sleeve when the driver or the like accesses a utility space according to Embodiment 1.

FIG. 9 is a diagram showing a trajectory of a hand and a trajectory of a sleeve when the driver or the like attempts to take a drink that has been put on the cup holder 22 of the utility space 2c. In Embodiment 1, the momentary type shift switch 3 is formed in a low-profiled shape and employs a configuration allowing operation of the shift lever with a short stroke. Thus, the momentary shift switch 3 is placed on a relatively rear side of the center console 2 in the vehicle front-rear direction. Then, the utility space 2c is provided in the space created between the instrument panel 1 and the center console 2. Here, if the holding unit described in the comparative example is employed, the sleeve or the like is caught on the holding unit every time the driver approaches the utility space 2c, and there is a concern that the usability of the utility space 2c is reduced extremely. On the other hand, in Embodiment 1, the configuration on which the sleeve or the like is not easily caught is employed. Thus, the usability of the utility space 2c can be improved.

As described above, the operational effects listed below can be obtained in Embodiment 1.

(1) The holding unit 31a is configured in such a way that its length in the radial direction at the first position of the axis O1 is shorter than the length thereof in the radial direction at a position lower than the first position, in the shift knob 31 of the driving mode switching device allowing switching of multiple driving modes by rotation of the lever unit 31b having the holding unit 31a on the upper end thereof, and the lever member 523 (lever member). In other words, the length of the holding unit 31a in the radial direction is equal to or longer than the length in the radial direction at the first position in a region extending downward from the first position in the axial direction of the lever unit 31b and the lever member 523 (lever member) to the bottom surface 315 (lowermost surface) of the holding unit 31a. Accordingly, a sleeve of cloth or an accessory or the like is not easily caught, and thus, erroneous operation can be avoided.

(2) In the holding unit 31a, the longest length in the radial direction is longer than a length thereof in the axial direction. To put it specifically, since the holding unit 31a is formed in a low-profiled shape, the holding unit 31a can receive the palm of the driver entirely, thereby bringing about a so-called palmrest effect. In addition, the low-profiled shape allows reduction in the space occupied by the shift lever in the vehicle interior space. Thus, the vehicle interior space can be effectively used.

(3) In the holding unit 31a, the outer shape of a cross section (in a side view) including the axis O1 has a curved line. Thus, even if the sleeve or the like comes in contact with the holding unit 31a, the sleeve or the like can be moved smoothly. Thus, it is made possible to prevent the sleeve or the like from being caught.

(4) The normal vector of the first curved surface 310 has a component upward in the direction of the axis O1. Thus, even if the sleeve or the like comes in contact with the holding unit 31a, the sleeve can be moved forward along the first curved surface 310 without being caught. Thus, the sleeve or the like can be prevented from being caught.

(5) The holding unit 31a includes the bulging portion 312 at a position above the first position, which is larger than the outer circumference in a top view at the first position, and smaller than the outer circumference in a top view at a position lower than the first position. Accordingly, the bulging portion 312 forms the finger hook portion where fingers of a hand of the driver are easily hooked, thereby making it possible to improve the operability. In addition, the amount of bulging is made smaller than the outer circumference in a top view at a lower position. Thus, it is made possible to prevent an accessory or the like from being caught.

(6) The momentary shift switch 3 is placed in the center console 2 in the vehicle interior and is attached in such a way that the bulging portion 312 bulges forward in the vehicle front-rear direction. To put it specifically, since it is extremely rare that a sleeve or the like of the driver is caught from the front side in the vehicle front-rear direction, it is possible to prevent a sleeve or the like from being caught.

(7) The holding unit 31a has the top surface portion 311, which is inclined with respect to a direction orthogonal to the axis O1. Thus, the top surface portion 311 can receive in a wide range, a force applied forward from the palm of the driver, thereby, making it possible to improve the operability.

(8) The holding unit 31a is applied to the momentary type shift switch 3. The momentary type allows a lever operation with a light force and thus easily causes erroneous operation, but adoption of the aforementioned configuration makes it possible to avoid such erroneous operation.

(9) The holding unit 31a includes the top surface portion 311 and the first curved surface 310 in the shift knob 31 of the driving mode switching device allowing switching of multiple driving modes by rotation of the lever unit 31b having the holding unit 31a on the upper end thereof and the lever member 523 (lever member). The top surface portion 311 is formed on the upper end of the holding unit 31a. The first curved surface 310 is an expansion portion on the outer side of the axis O2 passing through the reference point where the curvature (inclination) changes from the top surface portion 311, the expansion portion expanding in a direction toward the lowermost end in the axial direction from the reference point. Accordingly, a sleeve of cloth or an accessory or the like is not easily caught on the holding unit 31a, and thus, erroneous operation can be avoided. Note that, the first curved surface 310 is not necessarily formed on the entire circumference of the shift knob 31, and it is sufficient if the first curved surface 310 is formed in a region where a sleeve or the like is likely to be caught.

<Embodiment 2>

Figure 10:
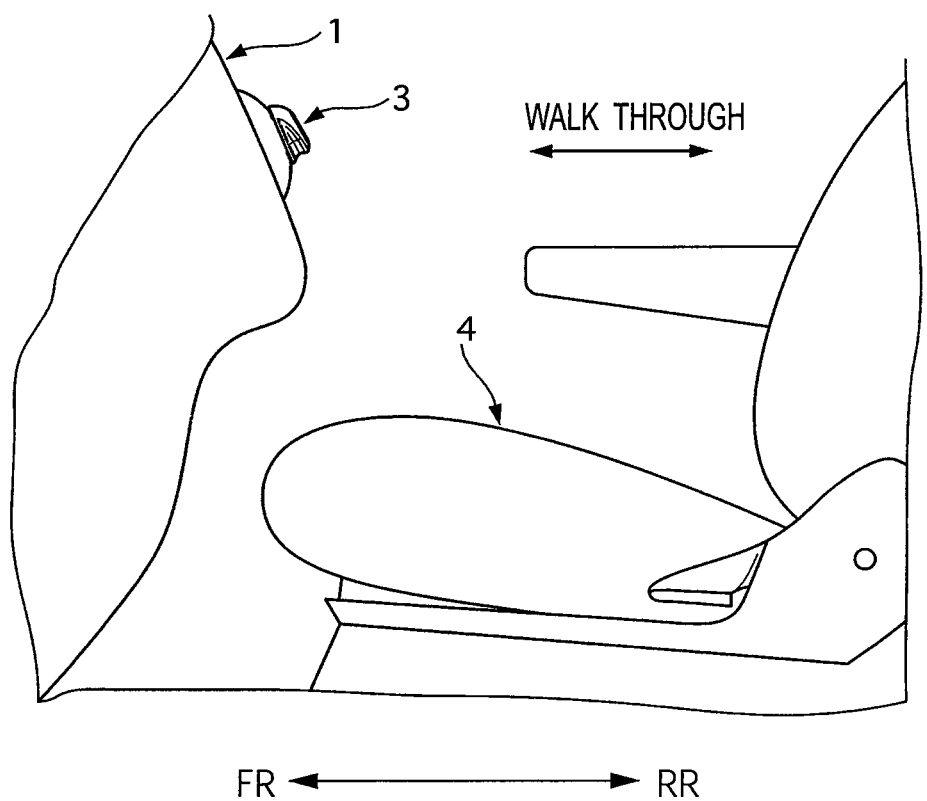
FIG. 10 is a partial side view showing vehicle interior of a vehicle according to Embodiment 2 of the present invention.

Next, a description will be given of Embodiment 2. Here, the basic configuration of Embodiment 2 is the same as that of Embodiment 1. Thus, a description will be given of only differences therebetween. FIG. 10 is a partial side view showing vehicle interior of a vehicle according to Embodiment 2. In Embodiment 1, the momentary type shift switch 3 is placed in the center console. On the other hand, the momentary type shift switch 3 is disposed on the instrument panel 1 in Embodiment 2. In case of a vehicle in which a walk-through is formed between the driver seat and the passenger seat, and a passenger is allowed to move between the driver seat or the passenger seat and a rear seat, for example, something may be caught on the holding unit along with the movement of the passenger. In this case, application of the present invention to the shift switch 3 makes it possible to prevent things from being caught and thus to avoid erroneous operation. Note that, in a case where the momentary type shift switch 3 is disposed in the instrument panel 1, the first curved surface 310 is preferably formed on an upper side in the vehicle vertical direction and the curvature surface 313 is preferably formed on a lower side in the direction of the vehicle interior. This is because this configuration makes it possible to avoid a situation where a passenger carelessly uses the momentary type shift switch 3 as a place for hanging a trash bag or the like.

As described above, the operational effects listed below can be obtained in Embodiment 2.

(10) The momentary type shift switch 3 is disposed on the instrument panel 1 in the vehicle interior, and the first curved surface 310 is formed on the upper side in a vehicle vertical direction. This configuration makes it possible to avoid a situation where a passenger carelessly uses the momentary type shift switch 3 as a place for hanging a trash bag or the like.

<Other Embodiments>

The invention of the driving mode switching device is described above on the basis of Embodiments 1 and 2, but another configuration is also included in the present invention. In the embodiments, a description is given of the momentary type shift switch, but the present invention is not limited to a shift-by-wire system and may be applied to another system such as a gate type shift device or a range selection type shift device for a normal automatic transmission, for example. In addition, a description is given of the electric vehicle in the embodiments, but the invention can be applied to a hybrid vehicle including an engine. Moreover, the first curved surface 310 is formed in Embodiment 1, but the surface is not limited to a curved surface and may be a flat inclination surface. Moreover, the configuration including the bulging portion 312 is employed in the embodiments, but a configuration not including the bulging portion 312 but including the first curved surface 310 formed entirely may be employed. In addition, the bulging portion is formed only at a certain position, but the bulging portion may be formed over the entire circumference.

The present application claims priority based on Japanese Patent Application No. 2009-172341 filed on Jul. 23, 2009, and Japanese Patent Application No. 2010-126398 filed on Jun. 2, 2010, the contents of which are hereby incorporated by reference into this application.

Industrial Applicability

According to the shift knob of the present invention, a sleeve of cloth or an accessory or the like is not easily caught, and thus, erroneous operation can be avoided.

REFERENCE SIGNS LIST 1 instrument panel
2 center console
3 momentary type shift switch
4 driver seat
31 shift knob
31a holding unit
31b lever unit
32 finisher gate
33 cover slide
315 bottom surface
321 finisher spherical surface
322 gate
333 sliding spherical surface
521 first rotation shaft
522 second rotation shaft
523 lever member

The invention claimed is:

1. A shift knob of a driving mode switching device allowing switching of a plurality of driving modes by rotation of a lever member having a holding unit on an upper end of the lever member, wherein
a first curved surface, on a rear side of the holding unit in a vehicle front-rear direction, or on an upper side of the holding unit, a distance of the first curved surface from an axis of the lever member increases as a distance of the first curved surface to a bottom surface of the holding unit decreases, and
a bulging portion, a curvature surface, and a radially-expanding portion are formed from a front side of the holding unit in the vehicle front-rear direction to lateral sides of the holding unit, or from a lower side of the holding unit in the vehicle vertical direction to lateral sides of the holding unit when the holding unit is disposed on the instrument panel, the bulging portion curving outward in a radial direction from the axis, the curvature surface curving inward in the radial direction and disposed at a position lower than the bulging portion in the direction of the axis, the radially-expanding portion being disposed at a position lower than the curvature surface in the direction of the axis, a distance of a surface of the radially-expanding portion from the axis increases as a distance of the surface of the radially-expanding portion to a bottom surface of the holding unit decreases.

2. The shift knob according to claim 1, wherein
in the holding unit, a longest length in the radial direction is larger than a length in the direction of the axis.

3. The shift knob according to claim 1, wherein
in the holding unit, an outer shape of a cross section including the axis has a curved line.

4. The shift knob according to claim 3, wherein
a normal vector of the curved line has a component upward in the direction of the axis of the lever member, on a rear side of the holding unit in the vehicle front-rear direction or on an upper side of the holding unit in the vehicle vertical direction when the holding unit is disposed on the instrument panel in the vehicle interior.

5. The shift knob according to claim 1, wherein
the bulging portion is formed at a position higher than a first position in the direction of the axis in such a manner to be larger than an outer circumference in a top view at the first position and smaller than an outer circumference in the top view at a position lower than the first position in the direction of the axis.

6. The shift knob according to claim 5, wherein
the bulging portion bulges forward in a vehicle front-rear direction when the holding unit is disposed in a center console in the vehicle interior.

7. The shift knob according to claim 1, wherein
the holding unit includes a top surface portion inclined with respect to a direction orthogonal to the axis.

8. The shift knob according to claim 1, wherein
the driving mode switching device is configured to return to its initial position regardless of an intention of a driver after operation.

9. A shift knob of a driving mode switching device allowing switching of a plurality of driving modes by rotation of a lever member having a holding unit on an upper end of the lever member, wherein
the holding unit includes:
a top surface portion formed on an upper end of the holding unit;
a bulging portion, a curvature surface, and a radially-expanding portion are formed from a front side of the holding unit in the vehicle front-rear direction to lateral sides of the holding unit, or are formed from a lower side of the holding unit in the vehicle vertical direction to lateral sides of the holding unit when the holding unit is disposed on an instrument panel in the vehicle interior, the bulging portion curving outward in a radial direction from an axis of the lever member, the curvature surface curving inward in the radial direction and disposed at a position lower than the bulging portion in the direction of the axis, the radially-expanding portion being disposed at a position lower than the curvature surface in the direction of the axis, a distance of a surface of the radially-expanding portion from the axis increases as a distance of the surface of the radially-expanding portion to a bottom surface of the holding unit decreases; and
an expansion portion formed on a rear side in the vehicle front-rear direction, or formed on an upper side in the vehicle vertical direction when the holding unit is disposed on the instrument panel, the expansion portion being radially on an outer side of a vertical line that passes through a reference point where a curvature changes from the top surface portion and expanding toward a lowermost end in a direction of the line from the reference point.

* * * * *